United States Patent [19]

Isozumi

[11] Patent Number: 4,881,416

[45] Date of Patent: Nov. 21, 1989

[54] ENGINE STARTER

[75] Inventor: Shuzoo Isozumi, Himeji, Japan

[73] Assignees: Mitsubishi Denki Kabushiki Kaisha, Japan;

[21] Appl. No.: 210,491

[22] PCT Filed: Oct. 1, 1987

[86] PCT No.: PCT/JP87/00730

§ 371 Date: Jul. 15, 1988

§ 102(e) Date: Jul. 15, 1988

[87] PCT Pub. No.: WO88/02568

PCT Pub. Date: Apr. 7, 1988

[30] Foreign Application Priority Data

| | | | |
|---|---|---|---|
| Oct. 3, 1986 | [JP] | Japan | 61-236559 |
| Oct. 6, 1986 | [JP] | Japan | 61-153450 |
| Oct. 6, 1986 | [JP] | Japan | 61-153451 |

[51] Int. Cl.[4] .................... F02N 15/06; H01H 51/06; H02K 13/10

[52] U.S. Cl. .................................... 74/7 A; 74/7 R; 74/7 E; 290/48; 310/237; 335/131

[58] Field of Search .................... 74/6, 7 R, 7 A, 7 E; 290/38 C, 48; 310/237; 335/131

[56] References Cited

U.S. PATENT DOCUMENTS

| | | | |
|---|---|---|---|
| 2,333,765 | 11/1943 | Cello | 74/7 A X |
| 2,578,094 | 12/1951 | Sears | 74/7 A |
| 2,687,789 | 8/1954 | Nardone | 74/7 A X |
| 3,851,532 | 12/1974 | Pfluger et al. | 74/7 A |
| 4,116,077 | 9/1978 | Mazzorana | 74/7 A |
| 4,366,385 | 12/1932 | Williams | 290/38 R |
| 4,587,861 | 5/1986 | Morishita | 74/7 E |
| 4,604,907 | 8/1986 | Morishita et al. | 74/7 E |

FOREIGN PATENT DOCUMENTS

| | | | |
|---|---|---|---|
| 165002 | 1/1950 | Austria | 74/7 A |
| 567293 | 2/1957 | Italy | 310/237 |
| 51-43315 | 3/1976 | Japan . | |
| 57-52773 | 11/1982 | Japan . | |
| 782191 | 9/1957 | United Kingdom | 74/7 A |
| 994887 | 6/1965 | United Kingdom . | |

*Primary Examiner*—Allan D. Herrmann

*Attorney, Agent, or Firm*—Leydig, Voit & Mayer

[57] ABSTRACT

An engine starter is equipped with a motor having a cylindrical armature rotating shaft (3), a clutch mechanism (15) which transmits the rotational force of the motor, an output rotating shaft (17) which is disposed so as to be movable in the axial direction so as to mesh with the clutch mechanism (15), and a solenoid switch (25) which has a moving member (35) which pushes the output rotating shaft (17) in the axial direction by electromagnetic force and which causes a movable contact (39) to contact a stationary contact (40) and supply current to the motor. The rear portion of the output rotating shaft (17) and the front portion of the moving body (35) are both inserted into the cylindrical bore of the armature rotating shaft (3) from opposite ends. The rear bracket (7) of the motor is made from molded plastic. The front portion of the rear bracket (7) is equipped with a bearing recess (7*d*) in which fits a bearing (8) which journals the rear end of the armature rotating shaft (3), and the stationary contact (40) is disposed on the bracket (7).

6 Claims, 4 Drawing Sheets

ENGINE STARTER

TECHNICAL FIELD

This invention relates to improvements in an engine starter for use in automobile engines and the like, and more particularly, it relates to an engine starter which houses a planetary reduction gear.

BACKGROUND ART

In the past, as one example of a starter of this type which housed a planetary reduction gear, there was the device shown in FIG. 1. In this figure, 100 is the armature of a direct current motor which is constituted by the following components. 101 is an armature core and 102 is an armature rotating shaft on the middle of which the armature core 101 is mounted. A commutator 103 fits on the rear portion of the armature 100. An armature coil 104 which is wound on the armature core 101 is connected to the commutator 103.

105 indicates brushes which are in contact with the commutator 103 and a holder which is connected to a rear bracket 107 by a bolt 106. 108 is a bearing which journals the rear end portion of the armature rotating shaft 102 and which fits into a recess in the rear bracket 107. 109 is a yoke of the direct current motor. A plurality of permanent magnets 109*a* which generate a magnetic field in the armature 100 are secured to its inner peripheral surface. A front bracket 111 into which is fit an internal gear 110 which constitutes a planetary reduction gear is mounted on the end surface of the yoke 109 as shown in the figure. A spur gear 112 is formed on the front end of the armature rotating shaft 102. Both it and the internal gear 110 mesh with a plurality of planetary gears 113. 114 indicates bearings which are mounted on the inner peripheral surfaces of the planetary gears 113 and which are journalled on supports pins 115. 116 is a flange to which the support pins 115 are secured. It constitutes an arm of the planetary reduction gear and it is secured to an output rotating shaft 117. 118 is a sleeve bearing which fits into the inner periphery of a protrusion of the internal gear 110 and which journals the output rotating shaft 117. 119 is a sleeve bearing which fits into a recess in the rear portion of the output rotating shaft 117 and which journals the front end of the armature rotating shaft 102. 120 is a steel ball which is disposed between the armature rotating shaft 102 and the output rotating shaft 117 and which has the function of bearing thrusts.

121 indicates helical splines which are formed on the outside of the midportion of the output rotating shaft 117. An overrunning clutch 122 engages therewith so as to be able to slide back and forth. 123 is a stopper which is disposed on the front end of the output rotating shaft 117 and which restricts the axial movement of a pinion 124 which is connected to the overrunning clutch 122. 125 is a sleeve bearing which is mounted on the inner surface of the front end of the front bracket 111 and which journals the front end of the output rotating shaft 117. 126 is a molded resin-based plastic lever which has a rotating shaft 126*a* at its midportion. As shown in the drawing, one end is connected to a plunger 128 of a solenoid switch 127 and the other end fits around the outside of the overrunning clutch 122. 129 is a movable contact which is mounted on a rod 131 through an electrically insulating member 130, the rod 131 being inserted into a core 132 and being slidable back and forth therein. 133 is a stationary contact which is secured to an electrically insulating member in the form of a cap 135 by a nut 134. 136 is an exciting coil which activates the plunger 128. It is wound around a molded resin-based plastic bobbin 137 and is housed inside a case 138. 139 is a lead wire which is connected to the stationary contact 133 and to the brushes of the brushes and holder 105.

Next, the operation will be explained. When an unillustrated starter switch is closed to cause current to flow through the exciting coil 136 of the solenoid switch 127, the plunger 128 is activated and moves backwards, pushing the rod 131 backwards and making the movable contact 129 and the stationary contact 133 come into contact with one another. As a result, current is supplied from the stationary contact 133 to the armature 100 by the brushes and holder 105 via the lead wire 139, and the armature 100 generates a rotational force. The rotation of the armature 100 is transmitted from the spur gear 112 to the planetary gears 113, and the rotation is transmitted to the overrunning clutch 122 while being reduced in speed by the planetary reduction gear. At this time, the pinion 124 which engages with the overrunning clutch 122 is made to rotate.

On the other hand, the force of the plunger 128 which is activated in the above manner causes the lever 126 to rotate in the counterclockwise direction about the rotating shaft 126*a* and slide the overrunning clutch 122 and the pinion 124 forward in the axial direction. As a result, the pinion 124 is brought into engagement with a ring gear which is secured to a flywheel which is mounted on the crankshaft of an unillustrated engine, for example.

After the engine is started, the overrunning clutch 122 separates from the pinion 124 due to the rotation of the engine with respect to the pinion 124, and the pinion 124 alone performs idle rotation.

As a conventional engine starter is constructed in the above-described manner, the solenoid switch and the direct current motor have their shafts arranged in parallel, so when the starter is mounted on an engine, it is necessary to ensure space for the solenoid switch in either the engine or in the portion of the side of the vehicle into which the engine fits. This creates problems such as restrictions on the engine layout in the vehicle. In addition, there was the problem that in order to avoid interference between the front end of the front bracket and a member such as a flywheel within the engine transmission housing, the shape of the flywheel was limited.

This invention was made in order to solve the above-described problems, and its object is to provide an engine starter in which a solenoid switch and a motor can be coaxially disposed in a compact manner, in which the bearing for the output rotating shaft can be cantilevered as seen from the pinion, and which is easy to mount on an engine.

DISCLOSURE OF THE INVENTION

An engine starter in accordance with this invention is of the type having an electric motor having a cylindrical armature rotating shaft, a clutch mechanism which transmits the rotational force of the motor, an output rotating shaft which is disposed so as to be able to move axially into engagement with the clutch mechanism, and a solenoid switch which has a moving member which pushes the output rotating shaft in the axial direction by electromagnetic force and which also causes a movable contact and a stationary contact to contact one another so as to supply current to the motor, characterized in that the end portion of the output rotating shaft and the front portion of the moving body are both inserted into the cylindrical bore of the armature rotating shaft from opposite directions, the rear bracket of the motor is made of a molded plastic, a recess is provided in the front portion of the rear bracket into which fits a bearing which journals the rear portion of the armature rotating shaft, and a stationary contact is disposed on the rear bracket. As a result, the extension of the overall length due to aligning the axes of the armature rotating shaft of the motor, the output rotating shaft, and the solenoid switch is decreased, and the structure becomes more compact and lighter.

Furthermore, in this invention, a radial commutator is used as a commutator for supplying current to the motor, as a result of which the overall length is made shorter.

In addition, in this invention, the holder which holds the brushes which contact the radial commutator is disposed on the rear bracket, and a recess for the stationary contact is provided in a location which is removed from the holder and the bearing recess.

In addition, notches which extend to the recess of the rear bracket are formed in the rear portion of the rear bracket with a shape which corresponds to that of a core which fits into the inner peripheral surface of the front end of the case of the solenoid switch which forms an opening, and the rear end of the bracket is made so as to be able to fit into the inner peripheral surface of the case. As a result, the overall length is decreased. In addition, with the above arrangement, the dimensions of the recesses can be made large, the contact surfaces of the stationary contact and the movable contact can be made large, and the capacity can be increased.

BEST MODE FOR CARRYING OUT THE INVENTION

In order to explain the present invention in greater detail, it will hereinbelow be explained based on the drawings.

Figure 2:
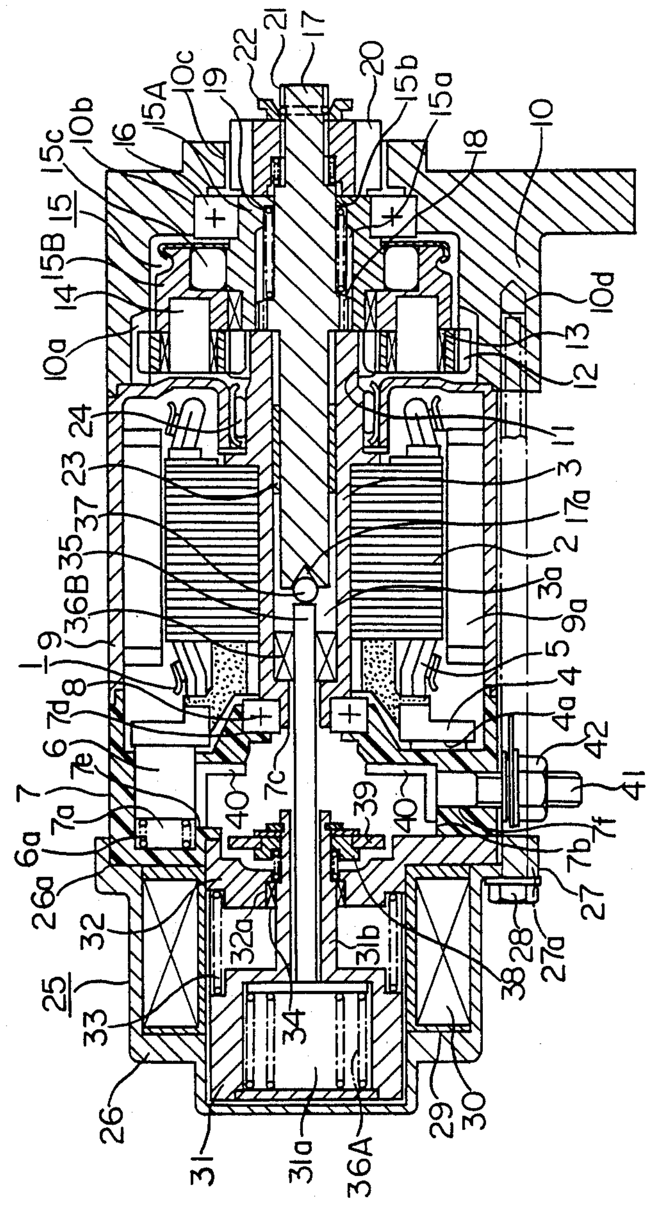
FIG. 2 is a cross-sectional view of a portion of one embodiment of an engine starter in accordance with this invention.

With respect to FIG. 2, "front" refers to the right side of the relevant components, and "rear" indicates the left side. 1 is the armature of a direct current motor which is composed of the following elements. 2 is an armature core, 3 is a cylindrical armature rotating shaft on the midportion of which the armature core 2 is mounted, the shaft having a cylindrical bore 3*a*. A radial commutator 4 fits onto the rear portion thereof, the commutator having a flat brush contact surface 4*a* which has an extending surface which is disposed at a prescribed angle, such as perpendicularly, with respect to the axis. An armature coil 5 which is wrapped around the armature core 2 is connected to the radial commutator 4 by suitable means.

6 is a brush which is urged forwards by a spring 6*a* disposed to the rear thereof. The end of the brush is pressed against the brush contact surface 4*a*. 7 is a plastic-molded rear bracket for the direct current motor. It has a plurality of holder holes 7*a* for housing members while allowing them to move back and forth which are disposed around the central axis and parallel to the axis. It also has a recess 7*b* which extends forwards from the rear end and is formed closer to the axis than the holder holes 7*a*. The rear bracket 7 has a shaft through hole 7*c* which is formed at the center of the bottom surface of the recess 7*b* and which extends frontwards and backwards in the axial direction and a bearing recess 7*d* which is formed in the front portion of the rear bracket 7, which is the front end of the shaft through hole 7*c*. Furthermore, the rear bracket 7 has holes 7*e* for reces 7*b* which extend between the inner peripheral surface of the recess 7*b* and the holder holes 7*a*, recesses 7*f* in recess 7*b* which are formed in the inner peripheral surface of recess 7*b*, and through holes 7*g* for screws which extend from recesses 7*f* to a portion of the rear bracket 7 not having a holder hole 7*a* and which are perpendicular, for example, with respect to the holder holes 7*a*. 8 is a bearing which journals the extreme rear end of the armature rotating shaft 3 and which fits into the bearing recess 7*d*.

9 is the yoke of the direct current motor whose rear end surface is joined to the front end surface of the rear bracket 7. A plurality of permanent magnets 9*a* which form a magnetic field in the armature 1 are secured to its inner peripheral surface. The step-shaped rear rim of a front bracket 10 which has an internal gear 10*a* which constitutes a portion of a planetary gear train formed thereon is mounted on the step-shaped outer rim on the front end surface of the yoke 9 as shown in the figure.

The front bracket 10 has a plurality of recesses formed therein whose inner diameters decrease in a step-wise manner from the rear towards the front. It has an internal gear 10*a* formed on the inner surface of its rear portion, bearing recesses 10*b* formed on the inside of its midportion, a small-diameter hole 10*c* formed in its front portion, and a screw hole 10*d* which extends forwards from its rear end surface. 11 is a spur gear which is formed on the outside of the front end of the armature rotating shaft 3 and which serves as a sun gear, and 12 indicates planetary gears which are disposed between and mesh with the spur gear 11 and the internal gear 10*a*. 13 indicates bearings which fit inside the planetary gears 12, 14 indicates support pins which support the bearings 13, and 15 is an overrunning clutch having a conventional overrunning clutch mechanism. It comprises an overrunning clutch inner member 15A having helical splines 15*a* which are formed on its inner surface near the axis and an inward protrusion 15*b* which is forward of the splines and has an inner diameter which is smaller than the inner diameter of the splines, an overrunning clutch outer member 15B which can engage with and disengage from the inner member 15A and which has the support pins 14 secured to its rear portion, and rollers 15C which are disposed between the overrunning clutch inner member 15A and the overrunning clutch outer member 15B.

16 is a bearing which fits over the overrunning clutch inner member 15A and carries radial loads and fits into the recess 10*b* in the front bracket 10. 17 is an output rotating shaft which has a recess 17*a* in its rear end surface. Teeth 18 for engaging with the splines 15a and which have a larger diameter than the inner diameter of the opening at the front end of the armature rotating shaft 3 are formed on the midportion of the output rotating shaft 17. These teeth engage with the helical splines 15a so as to be able to slide backwards and forwards. 19 is a spring which is disposed closer to the rotational axis than the roots of the teeth 18 between front surfaces thereof and the rear end of the inwards protrusion 15b. The spling 19 always biases the output rotating shaft 17 backwards. 20 is a pinion which engages with straight splines 21 which are formed on the front end of the output rotating shaft 17. 22 is a stopper which is disposed on the front end of the output rotating shaft 17 and which causes the pinion 20, which is biased in the forward direction by a spring which is disposed between a recess at the rear of the pinion 20 and a step in the output rotating shaft 17, to engage with the output rotating shaft 17.

23 is a sleeve bearing which fits into the cylindrical bore 3a of the armature rotating shaft 3. It journals the rear portion of the output rotating shaft 17 which is inserted into the cylindrical bore 3a from its front end and makes it possible for the output rotating shaft 17 to perform both linear and rotational movement. 24 is a bearing which fits into a bearing hole in the midportion of the front end of the yoke 9 and which journals the armature rotating shaft 3 between the installation portion for the armature core 2 and the spur gear 11.

25 is a solenoid switch which is directly connected to the rear portion of the direct current motor which has the armature 1. It has a switch mechanism for supplying current to the armature 1 when it is to be excited, and a mechanism for applying thrust to the output rotating shaft 17 at the same time. It comprises the following elements. 26 is a case which has an opening in its front end and which is rigidly held in place with its front end abutting against the rear end of the rear bracket 7. 27 is a lug which is formed on the front of the case 26 and protrudes outwards from the rear bracket 7 and has a bolt hole which extends forwards and backwards. 28 is a bolt which passes through the hole in the lug 27 and screws into the screw hole 10d of the front bracket 10 and secures the case 26 to the direct current motor and connects it to the rear bracket 7. 29 is a bobbin around which an exciting coil 30 is wound and which is housed in the case such that a recess for a coil extends forwards and backwards. 31 is a plunger which is made from a strongly magnetic member, which has a hollow portion 31a in a rear portion, and which loosely fits into the case 26 so as to be able to move within the coil recess of the bobbin 29. The front portion is a plunger tube 31b which has a hole which extends forwards and backwards and connects to the hollow portion 31a. 32 is a core which fits into an inner peripheral surface of the opening of the case 26, which has a step to which the bobbin 29 is secured, and which has a bearing hole 32a at its center. 33 is a spring which is disposed between the rear end surface of the core 32 and the front side of a step in the rear portion of the plunger 31 and which urges the plunger 31 backwards. 34 is a bearing which fits into the bearing hole 32a in the core 32 and which supports the plunger tube 31b so that it move forwards and backwards.

35 is a plunger rod having a T-shaped longitudinal cross section. Its rear end is disposed inside the hollow portion 31a and its rear surface is urged forwards by a spring 36A which is disposed to its rear within the hollow portion 31a. The portion to the front of the rear end is shaped like a rod. This portion passes through the plunger tube 31b, passes through the shaft through the hole 7c, is inserted into the rear opening of the armature rotating shaft 3, and is journalled by a bearing 36B which fits into the cylindrical hole 3a in the rear of the armature rotating shaft 3. The front end surface of the plunger rod 35 always abuts against a steel ball 37 which contacts the recess 17a.

38 is an electrically insulating member which is mounted on the outer surface of the front end of the plunger tube 31b in the cavity between the recess 7b and the core 32. It has a step formed in its front edge. 39 is a movable contact which has a hole formed therein and which fits into the step of the electrically insulating member 38.

40 indicates L-shaped stationary contacts. A first section of each, which is housed within recess 7b, confronts the movable contact 39. 41 is a screw which is connected to a back side of a second section of each stationary contact 40. The screw 41 passes through the screw through hole 7g and protrudes to the outside of the rear bracket 7 and a nut 42 is screwed onto the protruding portion. In this manner, an external terminal is formed, and at the same time the stationary contacts 40 are secured to the rear bracket 7.

One of the stationary contacts 40 is connected to an unillustrated direct current power supply. Another of the stationary contacts 40 is connected to (+) brushes 6 by unillustrated lead wires. The (−) brushes 6 are grounded by unillustrated lead wires. The (+) terminal of the direct current power supply is connected to the stationary contact 40 which is not connected in the above manner by an unillustrated lead wire the nut 42. Furthermore, the direct current power supply is connected to the exciting coil 30 through an unillustrated starter switch.

Figure 1:
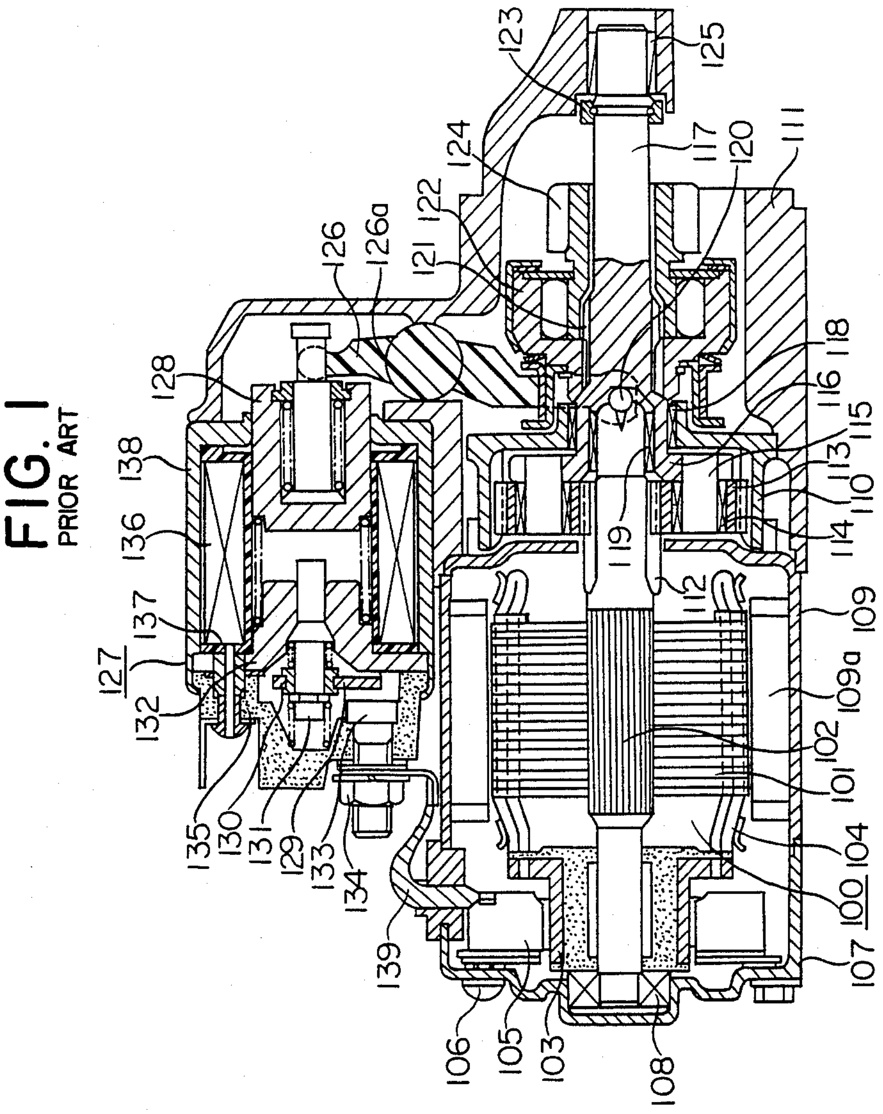
FIG. 1 PRIOR ART
FIG. 1 is a cross-sectional view of an example of a conventional engine starter.
Figures 3A, 3B:
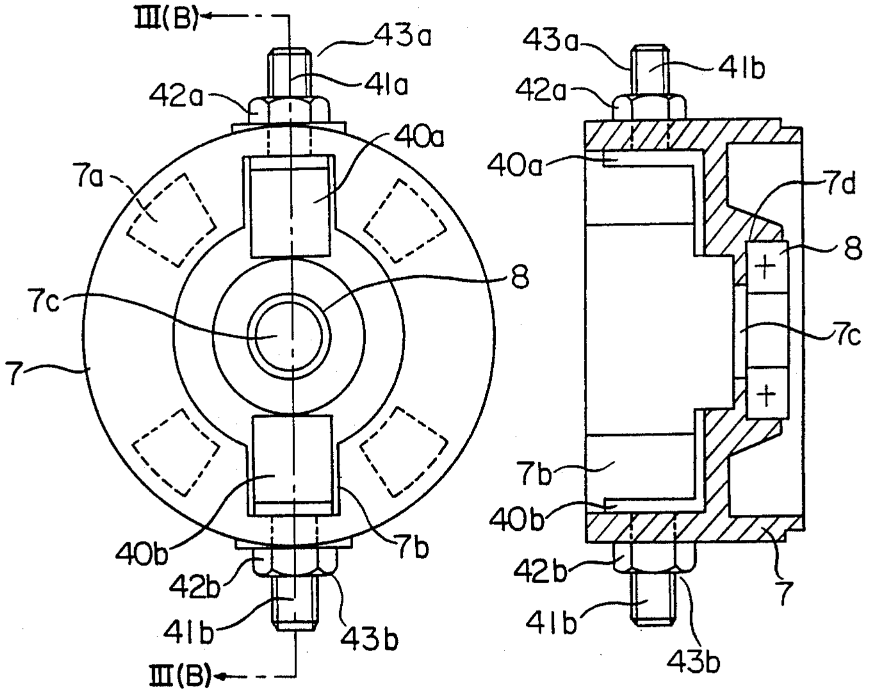
FIG. 3(A) is a rear view of a rear bracket and a stationary contact.
FIG. 3(B) is a cross-sectional view of FIG. 3(A) as shown by the line III(B)—III(B) in FIG. 3(A)

FIGS. 3(A) and 3(B) show the bracket 7, the stationary contacts 40, and the like of FIG. 2 in greater detail. FIG. 3(A) is a rear view as seen from the rear, and FIG. 3(B) is a cross-sectional view of FIG. 3(A). In these views, 40a and 40b are the stationary contacts 40, 42a and 42b are the nuts 42, 43a is a B terminal which is constituted by a screw 41a which is connected to stationary contact 40a and a nut 42b, and 43b is an M terminal which is constituted by a screw which is connected to stationary contact 40b and a nut 42b. The B terminal 43a is connected to the (+) terminal of a direct current power supply by an unillustrated lead wire, and the M terminal 43b is connected by unillustrated lead wires to (+) brushes 6 which are inside the holder holes 7a. Recess 7b has a two-level cylindrical recess and rectangular recesses in the shape of legs on either side of the central axis. The stationary contacts 40 are positioned in the rectangular recesses. The direct current power supply is connected to the exciting coils 30 of FIG. 1 through an unillustrated starter switch.

Figure 4:
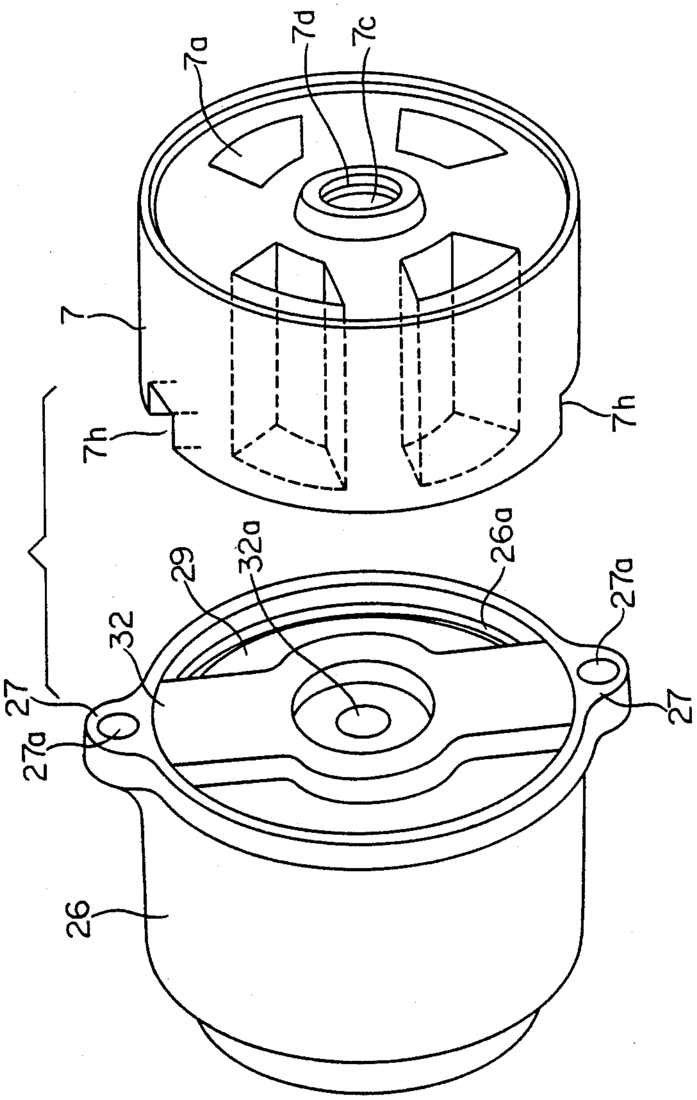
FIG. 4 is a disassembled view of the rear bracket, the core, and the case shown in FIG. 2.

FIG. 4 is a disassembled view which shows the relationship between the rear bracket 7, the case 26, and the core 32 which are shown in cross section in FIG. 2. The inner peripheral surface of the case 26 which forms an opening at the front end of the case 26 has a step 26a formed therein with respect to the axial direction. The diameter of the core 32 and the outer diameter of the rear end of the rear bracket 7 are roughly the same as the diameter of the opening of the case 26 so as to fit onto the step 26a. 7h is a pair of notches which are formed in the rear end of the rear bracket 7 and which connect to the recess 7*b* of FIG. 2. Their locations and size correspond to the core 32 and they are provided in locations which are removed from the holder holes 7*a*. With this structure, the core 32 can be fit onto the step 26*a* of the case 26, and by positioning the core 32 and the notches 7*h* so as to correspond with one another, the rear end of the rear bracket 7 can be fit onto the same step 26*a*.

Next, the operation of this embodiment of the present invention will be explained.

When the unillustrated starter switch is in an open state, the exciting coil 30 is in a nonconducting state in which it is unexcited, so the only force acting on the plunger 31 is the force of the spring 33. The plunger 31 and the plunger rod 35 are urged rearwards by this spring 33 to the rearmost position to which they can move. As a result, the output rotating shaft 17 does not receive a thrust from the solenoid switch 25, it is biased backwards the spring 19, and it is positioned backwards until the front end surface of the armature rotating shaft 3 and the rear surface of the teeth 18 abut, as shown in the drawing. At this time, as the movable contact 39 is separated from the stationary contacts 40, the stationary contacts 40 are in a floating state, current is not supplied from the direct current power supply to the armature 1, and the armature 1 is stopped.

If the above-mentioned starter switch is then closed, current is passed through the exciting coil 30 and it is energized. The electromagnetic force resulting from this energizing activates the plunger 31 and moves it forwards. As a result of this movement, the movable contact 39 also moves forwards and the movable contact 39 comes into contact with the stationary contacts 40. This contact shorts the stationary contacts 40 through the movable contact 39, and current from the direct current power supply flows through the stationary contacts 40, from the brushes which are electrically connected to the stationary contacts 40 to the radial commutator 4, and through the armature coil 5 to ground. The rotational force which is generated by the current flowing through the armature 1 in this manner is transmitted from the spur gear 11 to the planetary gears 12. The planetary gears 12 generate a revolving force, and this force is transmitted to the overrunning clutch 15. Due to the action of the rollers 15*c*, the overrunning clutch 15 is engaged, so the revolving force which is transmitted to the overrunning clutch 15 is transmitted from the helical splines 15*a* to the teeth 18 with which they are engaged. As a result, the output rotating shaft 17 rotates integrally with the pinion 20 at a slower rate than the armature 1.

On the other hand, the force of the plunger 31 which is urged forwards pushes the plunger rod 35 through the spring 36A and moves it forwards. Therefore, the output rotating shaft 17 receives a forward thrust from the plunger rod 35 through the steel ball 37, and this thrust moves it forwards together with the pinion 20 against the force of spring 19. At this time, the teeth 18 move forwards while engaging with the helical splines 15*a* and their position of engagement changes. Due to the forwards movement of the output rotating shaft 17, the pinion 20 which protrudes forwards through the small-diameter hole 10*c* meshes with a ring gear on the outer periphery of a flywheel which is mounted on the engine. Therefore, the rotational force of the armature 1 is transmitted to the ring gear by the pinion mechanism at a reduced speed, and the engine is started.

Immediately after the engine has started, the rotational force of the engine is transmitted to the pinion 20 through the ring gear. Therefore, the rotational speed of the pinion 20 and the output rotating shaft 17 increases. Due to the action of the rollers 15*c* caused by this rotation, the overrunning clutch 15 disengages, and the pinion 20 rotates idly together with the output rotating shaft 17 and the like.

Furthermore, after the starting of the engine, when the starter switch is opened, the starter returns to its initial state (the illustrated state).

In the above-described embodiment, the case was explained in which a radial commutator was employed, but a conventional commutator can be used instead.

In addition, in the above-described embodiment, the case was explained in which a planetary reduction gear was provided between the armature rotating shaft and the output rotating shaft, but when it is not necessary to reduce the rotational speed of the output rotating shaft, a planetary reduction gear may be omitted.

In addition, in the above-described embodiment, the case was explained in which the magnetic field of the direct current motor was generated by permanent magnets, but the same effects as with the above-described embodiment can be obtained if a coil is wound around a magnetic pole core.

Furthermore, in the above-described embodiment, the stationary contact 40 and the (+) brushes 6 were connected by lead wires, but it is possible to omit lead wires and have them directly contact one another through hole 7*e*.

We claim:

1. An engine starter comprising:

an electric motor connected to receive electric current via a stationary contact, said electric motor having a cylindrical armature rotating shaft, an output rotating shaft disposed at a first axial end of said motor in an axially aligned relationship with respect to said armature rotating shaft and supported to slide in an axial direction of said shafts, a clutch mechanism connected between said armature rotating shaft and said output rotating shaft to transmit rotational force of said armature rotating shaft to said output rotating shaft, and a solenoid switch which has a moving member disposed on a second axial end of said motor, said moving member including a plunger rod movable in the axial direction responsive to a state of said solenoid switch to push and slide said output rotating shaft by electromagnetic force in the axial direction, said solenoid switch also having a movable contact movable in the axial direction responsive to the state of said solenoid switch to establish and break contact with a stationary contact, thereby supplying current to said motor, a rear portion of said output rotating shaft and a front portion of said moving member extending into a cylindrical bore of said armature rotating shaft from opposite directions, said motor including a rear bracket of molded plastic, said rear bracket including a front portion having a bearing recess containing a bearing which journals a rear end portion of said armature rotating shaft wherein said stationary contact is installed on said rear bracket.

2. An engine starter comprising:

an electric motor connected to receive electric current via a stationary contact, said electric motor having a cylindrical armature rotating shaft, an output rotating shaft disposed at a first axial end of said motor in an axially aligned relationship with respect to said armature rotating shaft and supported to slide in a axial direction of the shafts, a clutch mechanism connected between said armature rotating shaft and said output rotating shaft to transmit rotational force of said armature rotating shaft to said output rotating shaft, a solenoid switch which has a moving member disposed on a second axial end of said motor, said moving member including a plunger rod movable in the axial direction responsive to a state of said solenoid switch to push and slide said output rotating shaft by electromagnetic force in the axial direction, said solenoid switch also having a movable contact movable in the axial direction responsive to the state of said solenoid switch to establish and break contact with a stationary contact, thereby supplying current to said motor, a rear portion of said output rotating shaft and a front portion of said moving member both extending into a cylindrical bore of said armature rotating shaft from opposite directions, said motor including a rear bracket of molded plastic, said rear bracket including a front portion having a bearing recess containing a bearing which journals a rear end of portion said armature rotating shaft wherein said stationary contact is installed on said rear bracket, and:

a radial commutator which fits on said rear end portion of said armature rotating shaft and has a flat contact surface, brushes having ends contacting said contact surface, and holder holes which house said brushes and allow said brushes to freely move located in a portion of said rear bracket around a bearing recess of said rear bracket.

3. An engine starter as claimed in claim 2, characterized in that a recess in which said stationary contact is disposed is formed in said rear bracket in a location removed from said holder holes and said bearing recess, and said movable contact is disposed so as to confront said stationary contact in the hollow portion of said rear bracket recess.

4. An engine starter as claimed in claim 2 wherein said moving member is a highly magnetic body and comprises:

a plunger having a hollow rear portion and a front portion including a hole which connects to said hollow portion and which extends in the axial direction of movement, a plunger rod having a rear end disposed within said hollow portion and a rod-shaped forward end, a spring disposed within said hollow rear portion to urge said plunger rod forward, and an electrically insulating member on the forward end, said movable contact being mounted outside the front portion of said plunger on said electrically insulating member so as to confront a contact surface of said stationary contact.

5. An engine starter comprising:

an electric motor connected to receive electric current via a stationary contact, said electric motor having a cylindrical armature rotating shaft, an output rotating shaft disposed at a first axial end of said motor in an axially aligned relationship with respect to said armature rotating shaft and supported to slide in an axial direction of said shafts, a clutch mechanism connected between said armature rotating shaft and said output rotating shaft to transmit rotational force of said armature rotating shaft to said output rotating shaft, and a solenoid switch which has a moving member disposed on a second axial end of said motor, said moving member including a plunger rod movable in the axial direction responsive to a state of said solenoid switch to push and slide said output rotating shaft by electromagnetic force in the axial direction, said solenoid switch also having a movable contact movable in the axial direction responsive to the state of said solenoid switch to establish and break contact with a stationary contact, thereby supplying current to said motor, a rear portion of said output rotating shaft and a front portion of said moving member both extending into a cylindrical bore of said armature rotating shaft from opposite directions, said motor including a rear bracket of molded plastic, said rear bracket including a front portion having a bearing recess containing a bearing which journals a rear end portion of said armature rotating shaft wherein said stationary contact is installed on said rear bracket, said moving member comprising a highly magnetic body and including a plunger having a hollow rear portion and a front portion having a hole which connects to said hollow portion and which extends in the axial direction and further comprising a plunger rod having a rear end disposed within said hollow rear portion and a spring disposed within a rear portion of said hollow portion to urge said plunger rod forward, said plunger rod having a rod-shaped forward end, an electrically insulating member on said forward end, said movable contact being mounted outside the front end of said plunger on said electrically insulating member so as to confront a contact surface of said stationary contact.

6. An engine starter comprising:

an electric motor connected to receive electric current via a stationary contact, said electric motor having a cylindrical armature rotating shaft, an output rotating shaft disposed at a first axial end of said motor in an axially aligned relationship with respect to said armature rotating shaft and supported to slide in an axial direction of said shafts, a clutch mechanism connected between said armature rotating shaft and said output rotating shaft to transmit rotational force of said armature rotating shaft to said output rotating shaft, a solenoid switch which has a moving member disposed on a second axial end of said motor, said moving member including a plunger rod movable in the axial direction responsive to a state of said solenoid switch to push and slide said output rotating shaft by electromagnetic force in the axial direction, said solenoid switch also having a movable contact movable in the axial direction responsive to the state of said solenoid switch to establish and break contact with a stationary contact, thereby supplying current to said motor, a rear portion of said output rotating shaft and a front portion of said moving member both extending into a cylindrical bore of said armature rotating shaft from opposite directions, said motor including a rear bracket of molded plastic, said rear bracket including a front portion having a bearing recess containing a bearing which journals a rear end portion of said armature rotating shaft wherein said stationary contact is installed on said rear bracket, a case containing said solenoid switch having an open portion on a side facing said rear bracket, and a core disposed in the open portion of said case which has a hole for guiding said moving member into the cylindrical bore of said armature rotating shaft, wherein notches which correspond in shape to said core are formed in a rear end portion of said rear bracket, and the rear end portion of said rear bracket fits into the inside of said case.

* * * * *